United States Patent [19]

Shibata

[11] Patent Number: 5,026,570

[45] Date of Patent: Jun. 25, 1991

[54] METHOD FOR PREPARING FREEZE-DRIED RICE

[75] Inventor: Toshio Shibata, Shizuoka, Japan

[73] Assignee: Futaba Shokuhin Kogyo Kabushiki Kaisha, Shizuoka, Japan

[21] Appl. No.: 507,027

[22] Filed: Apr. 10, 1990

[51] Int. Cl.$^5$ ................................................ A23L 1/20
[52] U.S. Cl. ..................................... 426/626; 426/385; 426/523; 426/640
[58] Field of Search ............... 426/626, 640, 385, 523

[56] References Cited

U.S. PATENT DOCUMENTS

| | | | |
|---|---|---|---|
| 3,692,533 | 9/1972 | Paine | 426/385 |
| 3,803,334 | 4/1974 | Hunnell | 426/626 |
| 3,961,092 | 6/1976 | Forest et al. | 426/626 |

*Primary Examiner*—R. B. Penland
*Attorney, Agent, or Firm*—Wegner, Cantor, Mueller & Player

[57] ABSTRACT

Disclosed is a method of making freeze-dried rice comprising boiling rice in water which contains acetic acid and sodium chloride and freeze-drying the boiled rice.

2 Claims, No Drawings

METHOD FOR PREPARING FREEZE-DRIED RICE

This invention involves a method for preparing freeze-dried rice, especially for an improved method wherein the time for reconstituting the freeze-dried rice can be shortened.

Recently, along with variation of life styles, a variety of instant precooked foods have been developed and popularized. Among them, freeze-dried rice of high quality which takes a shorter time to swell upon reconstitution has been required since it usually takes a long time to boil uncooked rice. This freeze-dried rice is a food which can be reconstituted by immersion in hot water, and then served as cooked rice. It is necessary that such freeze-dried rice be reconstituted quickly without loss of good taste and eating texture (i.e., good chewing resistance).

In the Japanese bulletin of patent claims, Vol. 62-58962, a method for shortening the reconstitution time of rice has been proposed, which is characterized by freezing α-formed rice to pass the maximum ice crystal forming temperature for over 30 minutes and thereafter drying it until the water content is less than 15%. In this method, the reconstitution time was shortened to 3.5 minutes, but it took more than 30 minutes to pass the maximum ice crystal forming temperature. Moreover, the taste and eating texture deteriorated because the rice structure became porous.

On the other hand, a method for improving the eating texture of freeze-dried rice has been claimed in the Japanese bulletin, Vol. 64-43161, which consists of a well-known freeze-drying method and a method of treatment of the rice after drying, characterized by spraying the dried rice with acidic water containing an organic acid and then drying the sprayed rice. This method facilitates the addition of water to the dried rice by taking advantage of the organic acid to reduce the surface tension of the water. The claim demonstrates an improvement in eating texture, but the reconstitution time of the freeze-dried products is not disclosed. Moreover, it is not clear that spraying alone can make the acidic water penetrate the inner part of the rice. In addition, the requirement of both a spraying and redrying process, as well as the usual freeze-drying process, lowers the efficiency of production and raises the production cost.

As described above in previous methods, efforts to improve the reconstitution time resulted in deterioration of taste and eating texture, and any improvement in taste and eating texture required a longer or complex procedure.

This invention is provided in order to solve the above problems. The present invention provides a simple method for preparing freeze-dried rice, which has good taste and eating texture, and can be reconstituted with hot water in a relatively short time.

The preparation method for freeze-dried rice in this invention comprises a boiling process to cook the rice and a freeze-drying process to freeze-dry the cooked rice, wherein the water employed in the boiling process contains an organic acid and sodium chloride. By this invention, the reconstitution time of the freeze-dried rice is shortened because, in the boiling process, the organic acid can penetrate the inner part of the rice by adding the organic acid to the rice-boiling water. The production process for freeze-dried rice according to this invention is very simple, because the boiling and freeze-drying processes involved are minimal for preparation of freeze-dried rice, and because only the addition of an organic acid and sodium chloride to boiling water is further needed. Moreover, the adjustment of the contents of the organic acid and sodium chloride enables one to prepare a high-quality freeze-dried rice without loss of eating texture and good taste.

The method of the present invention comprises boiling a suitable amount of rice in water and subsequently freeze-drying the boiled rice, wherein the boiling water contains an organic acid, preferably acetic acid, and sodium chloride. Preferably, the acetic acid is added at about 4-8% by weight of the boiling water, and sodium chloride is added at about 0.5-3% by weight of the boiling water. Addition of acetic acid or sodium chloride outside these ranges may lead to rice that has an undesirable salty or sour taste, or may require a longer time for reconstituting the freeze-dried rice. Freeze-drying may be performed by employing a conventional vacuum freeze-drying apparatus.

For reconstituting the freeze-dried rice, hot water is added in an amount sufficient to immerse the rice. The mixture of hot water and rice is allowed to stand for about three minutes to allow the rice to absorb the water and obtain a desirable consistency.

If desired, other optional ingredients may be added to the rice. For example, seasoning or nutritional supplements may be added to the boiling water.

EXAMPLES

The following is an example of preparation of freeze-dried rice according to the methods of this invention.

Rice (1.5 kg) was boiled with 4.5 kg rice-boiling water containing 6% acetic acid and 2% sodium chloride. Then, the boiled rice was washed with water to cool it and prevent adhesion between grains of rice. Consequently, the rice was placed in a vacuum freeze-drying apparatus for 38 hours and the freeze-dried rice contained 7.1% water and 92.9% solid material.

To compare with this example, three kinds of freeze-dried rice were prepared by the same method except that the contents of the rice-boiling water was changed. Namely, these comparisons were prepared with rice-boiling water (4.5 kg) containing water alone (comparative example 1), 2% sodium chloride (comparative example 2), and 6% acetic acid (comparative example 3).

Then, the freeze-dried rice obtained in the above examples was reconstituted with hot water and tested. The results are shown in the Table. The test was conducted by a questionnaire submitted to a total of 20 persons, 5 men and 5 women in their twenties, and 5 men and 5 women in their thirties. The result is expressed in an average of 20 replies.

TABLE

|  | time | eating feeling | taste |
| --- | --- | --- | --- |
| comparative example 1 | 2 min. | solid | — |
| (water alone) | 3 min. | solid | — |
|  | 5 min. | slightly solid | — |
|  | 7 min. | soft | tasty |
| comparative example 2 | 2 min. | slightly soft | salty |
| (NaCl 2%) | 3 min. | soft | slightly salty |
|  | 5 min. | soft | slightly salty |
|  | 7 min. | soft | slightly salty |
| comparative example 3 | 2 min. | slightly soft | slightly sour |
| (acetic acid 6%) | 3 min. | soft | sour |
|  | 5 min. | soft | sour |
|  | 7 min. | soft | sour |

TABLE-continued

| | time | eating feeling | taste |
|---|---|---|---|
| example | 2 min. | slightly soft | tasty |
| (acetic acid 6% | 3 min. | soft | tasty |
| & NaCl 2%) | 5 min. | soft | tasty |
| | 7 min. | soft | tasty |

The results shown in the Table indicate that soft and tasty rice was obtained in 3 minutes in the example according to the present invention. In comparison it took 7 minutes to get soft and tasty rice in comparative example 1. With boiling water containing only acetic acid, or only sodium chloride, as shown in the comparative examples 2 and 3, the addition of acetic acid (6%) alone made the taste of the rice sour, and the addition of sodium chloride (2%) alone made the rice taste salty. Therefore, it is clear that the addition of appropriate contents of both acetic acid and sodium chloride can improve the taste of freeze-dried rice.

As described above, the method of this invention results in obtaining freeze-dried rice in a very simple procedure, which is superior in taste and eating texture than rice prepared by previous methods. Further, the present method requires a shorter reconstitution period.

Claimed is:

1. A method for producing freeze-dried rice consisting essentially of the steps of:
   (a) boiling rice in water containing acetic acid and sodium chloride, wherein the acetic acid comprises about 4–8% by weight of the water and the sodium chloride comprises about 0.5–3% by weight of the water; and
   (b) freeze-drying the boiled rice.

2. The method of claim 1, wherein the acetic acid comprises about 6% by weight of the water and the sodium chloride comprises about 2% by weight of the water.

* * * * *

UNITED STATES PATENT AND TRADEMARK OFFICE
CERTIFICATE OF CORRECTION

PATENT NO. : 5,026,570

DATED : June 25, 1991

INVENTOR(S) : Toshio SHIBATA

It is certified that error appears in the above-identified patent and that said Letters Patent is hereby corrected as shown below:

Please insert the following on the title page:

-- [30]   Foreign Application Priority Data

Oct. 27, 1989 [JP]   Japan.............01-278454 --.

Signed and Sealed this

Twenty-seventh Day of October, 1992

Attest:

DOUGLAS B. COMER

*Attesting Officer*          *Acting Commissioner of Patents and Trademarks*